Oct. 4, 1966

G. W. JACKSON 3,276,476

FLUID CONTROL VALVE

Filed Nov. 29, 1963

INVENTOR.
George W. Jackson
BY
J. C. Evans
HIS ATTORNEY

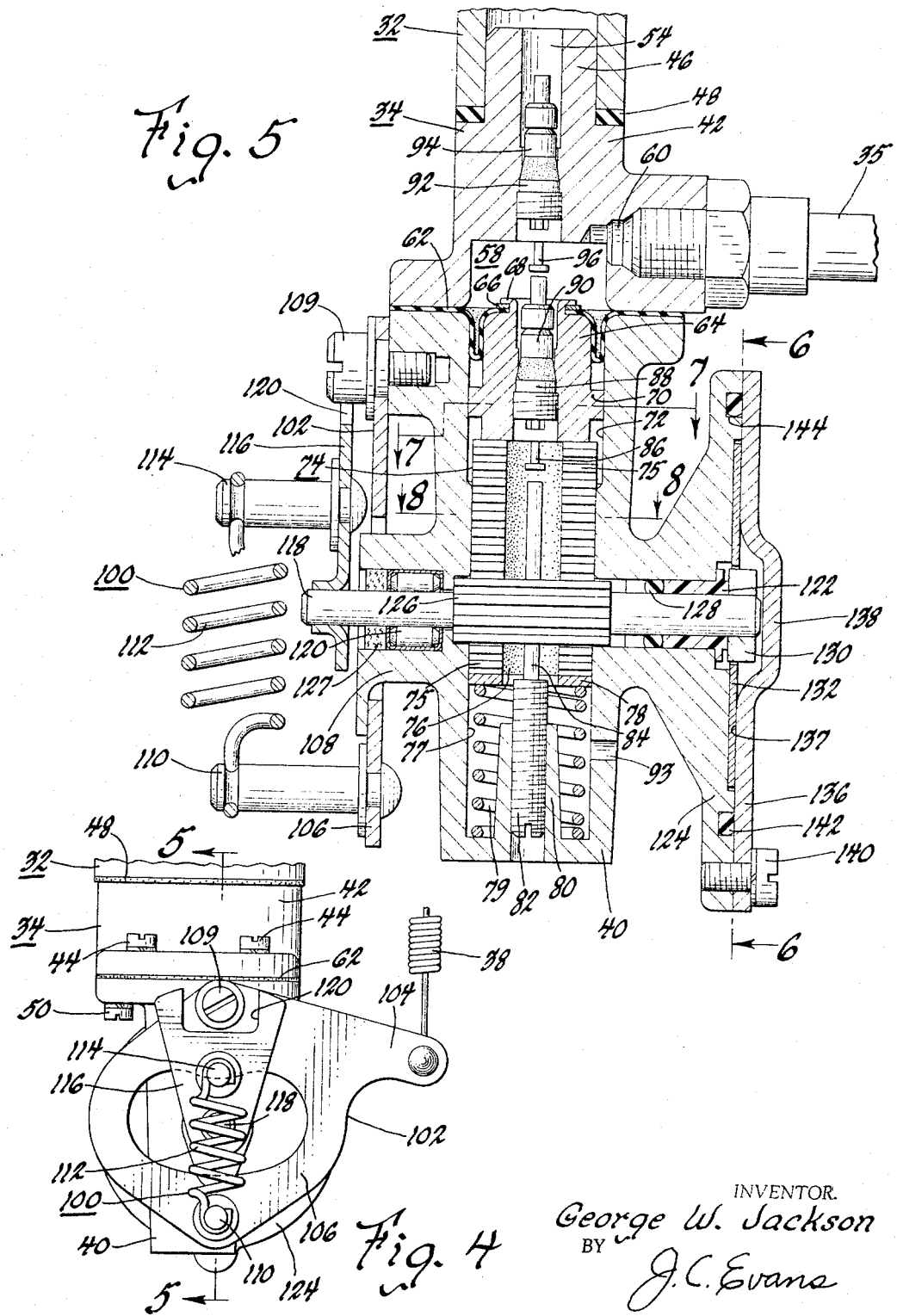

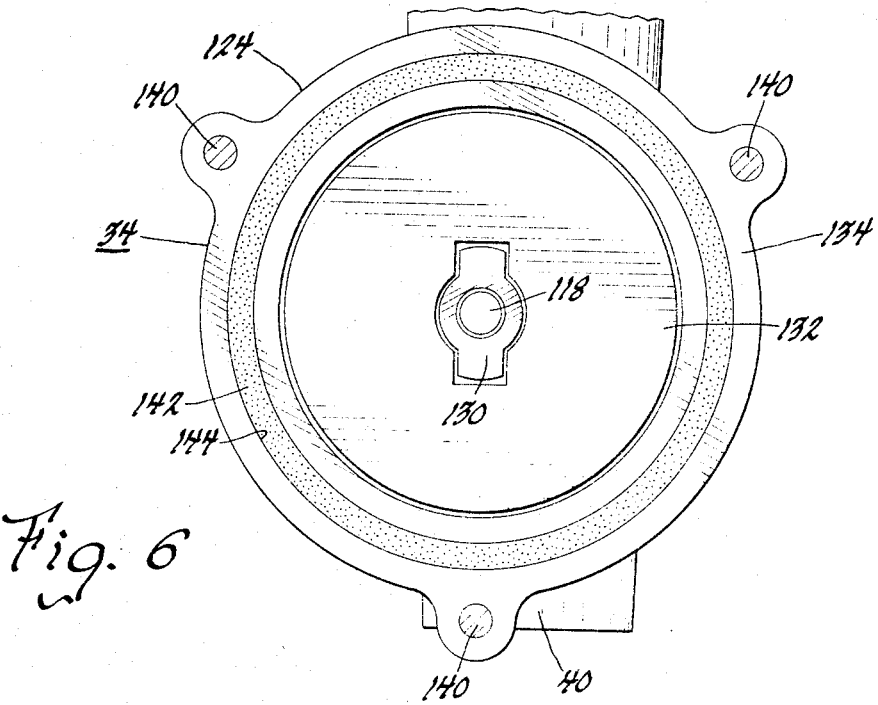
Fig. 6
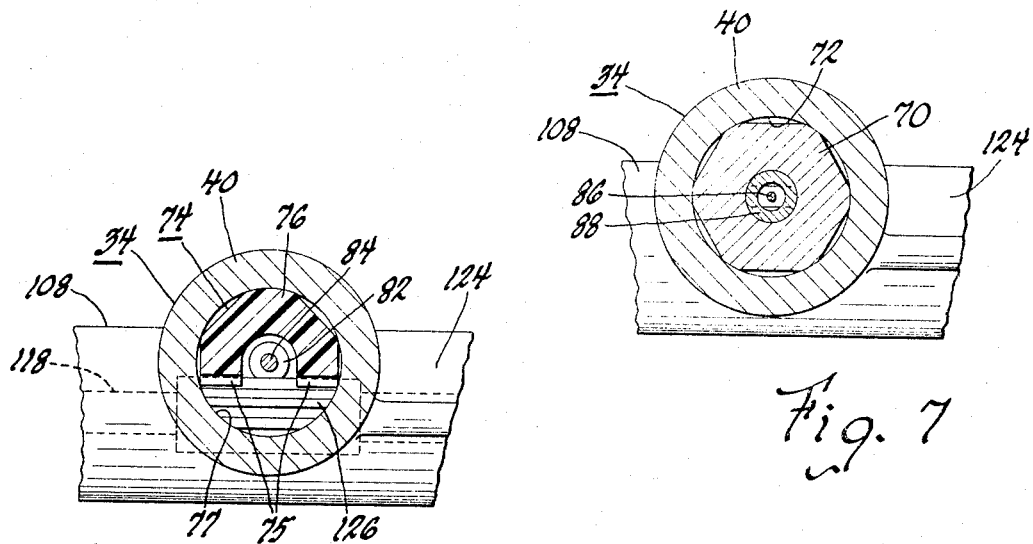
Fig. 8
Fig. 7
INVENTOR.
George W. Jackson
BY
J.C. Evans
HIS ATTORNEY

United States Patent Office 3,276,476
Patented Oct. 4, 1966

3,276,476
FLUID CONTROL VALVE
George W. Jackson, Dayton, Ohio, assignor to General Motors Corporation, Detroit, Mich., a corporation of Delaware
Filed Nov. 29, 1963, Ser. No. 327,009
15 Claims. (Cl. 137—627.5)

This invention relates to fluid control valves and more particularly to valves for controlling flow of pressurized fluid to air lift spring devices and the like.

An object of the present invention is to provide a fluid control device of economical construction that is adjustable to a plurality of settings for varying the pressurization of an air actuated device including the provision of improved means therein to prevent transient pressure build-ups in the air actuated device from affecting present controlled conditions therein.

A further object of the present invention is to provide a fluid control device having a pressure responsive valve actuator element acted upon by an economical multiple spring unbalancing arrangement wherein at least one unbalancing spring can be adjustably positioned for varying pressure conditions in an associated air actuated device.

A still further object of the present invention is to improve a fluid control device for manually selecting one of a plurality of supplemental load supporting pressures in the air spring of an air lift system by the provision therein of a pressure responsive valve actuator element having a variable effect determined by a plural spring unbalancing arrangement operatively associated with the pressure responsive valve actuator through damping means that prevents transient variations in air spring pressure produced by road shock conditions from varying the load supporting pressure selected by the improved device when the air spring is stabilized.

Further objects and advantages of the present invention will be apparent from the following description, reference being had to the accompanying drawings wherein preferred embodiments of the present invention are clearly shown.

In the drawings:

FIGURE 4 is a fragmentary end elevational view looking in the direction of arrow 4 in FIGURE 3;

FIGURE 5 is an enlarged view in vertical section taken along the line 5—5 of FIGURE 4;

FIGURE 6 is a view in vertical section taken along the line 6—6 of FIGURE 5;

FIGURE 7 is a view in horizontal section taken on line 7—7 of FIGURE 5; and

FIGURE 8 is a view in horizontal section taken on line 8—8 of FIGURE 5.

Figure 1:
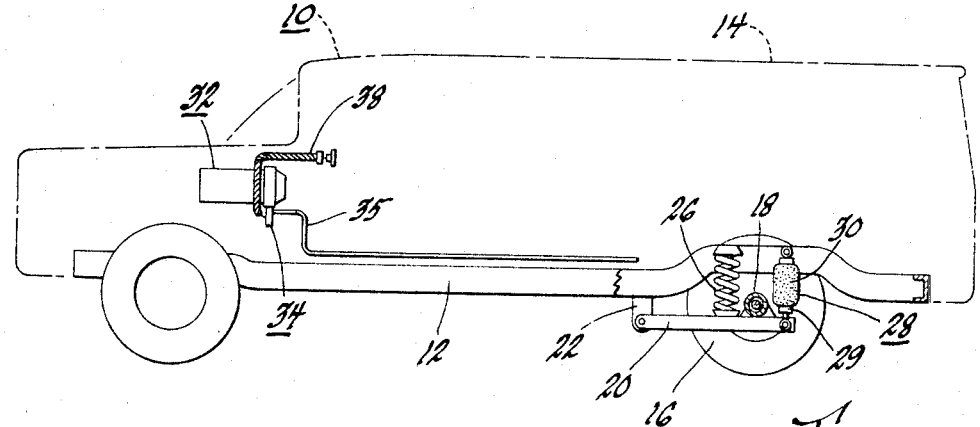
FIGURE 1 is a view in side elevation of a vehicular air suspension system using the control valve of the present invention.
Figure 2:
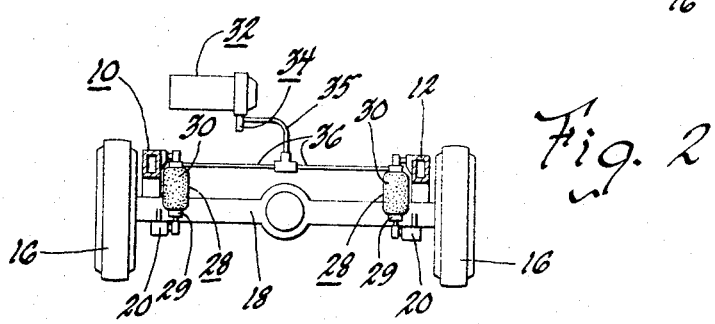
FIGURE 2 is an end elevational view of the system of FIGURE 1.

In FIGURES 1 and 2 of the drawings, a vehicle 10 is illustrated that includes a sprung assembly comprising a chassis frame 12 and a body 14 supported thereon along with conventional parts normally associated therewith and further including an unsprung assembly comprising ground engaging wheels 16 supported on an axle housing 18 in a conventional manner along with the other parts normally associated with such wheels and housing.

The sprung assembly is supported on the axle housing 18 by means representatively illustrated as including a pair of control arms 20 each having one of its ends pivotally secured to a bracket 22 fixed to chassis frame 12. Each control arm 20 is also fixedly secured adjacent its opposite end to axle housing 18 through a bracket 24 to thereby serve as a support for one of a pair of coil type chassis springs 26 mounted between the control arms 20 and the frame 12 for producing a desired spring support between sprung and unsprung masses. In addition to the supporting action of each coil type spring 26, ride control is provided by a pair of shock absorber and air spring auxiliary suspension units 28, respectively, pivotally secured at the opposite end of one or the other of control arms 20 and frame 12.

Details of a typical combination shock absorber and air spring auxiliary suspension unit 28 are more particularly set forth in the patent to Schmitz et al.—3,042,392, issued July 3, 1962, with it being understood that each of the auxiliary units 28 basically includes a direct-acting hydraulic shock absorber unit 29 having an inflatable element or air spring 30 thereon of a suitable resilient material that, when inflated, will supplement the load-carrying capacity of the spring 26 so as to prevent excessive engagement of bump stops on the vehicle and/or undue elevation of the front end of the vehicle when heavy loads are carried over the axle housing 18. The above-described structure is, of course, merely representative of a typical pressure actuated device with which the control valve of the present invention might be associated.

In the illustrated arrangement a combination vacuum pump and reservoir 32 of high pressure fluid is communicated with the inflatable element 30 of the auxiliary suspension unit 28 through a control valve 34 that embodies features of the present invention, a conduit 35 and branch conduits 36. The control valve 34 is actuated by suitable means such as a Bowden wire assembly 38 located at a readily accessible point, for example, on the dashboard of the vehicle, so that the vehicle operator can quickly inflate or deflate the air springs to properly support the weight of the sprung mass.

Figure 3:
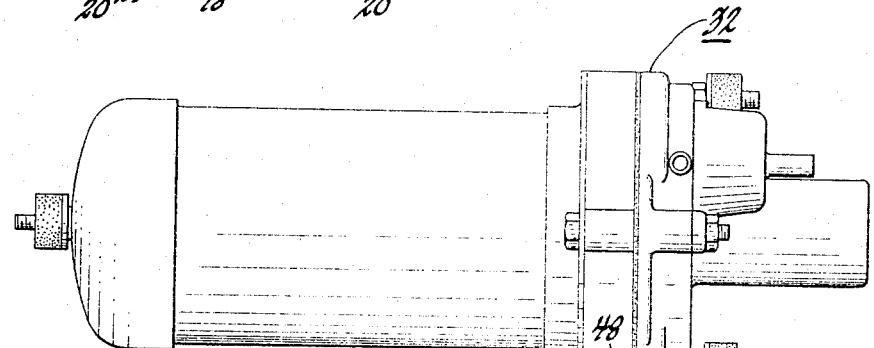
FIGURE 3 is a side elevational view showing a vacuum pump and pressure reservoir supporting the control valve of the present invention.

Referring now to FIGURES 3 through 5, the improved fluid control valve 34 is illustrated as comprising an elongated tubular delay mechanism housing portion 40 having one end thereof connected to an intake housing portion 42 by suitable fastening means, for example, screws 44, with the intake housing having a small diameter, tubular end portion 46, as best seen in FIGURE 5, received within an opening in the reservoir 32 where a resilient element 48 is supported by the reservoir 32 to sealingly engage the outer periphery of the tubular end 46 to prevent fluid leakage along the outer periphery thereof from the reservoir 32. The intake housing 42 is fastened by suitable fastening means, for example, screws 50 to the reservoir 32 to depend therefrom.

The intake housing 42 has an intake passageway 54 directed longitudinally therethrough communicating at one end thereof internally of the reservoir 32 and at the opposite end thereof with an open-ended pressure chamber 58 in the opposite end of the housing 42 that communicates with an outlet passageway 60 formed in the side of the housing 42. The open-ended pressure chamber 58 is closed by means of a flexible diaphragm 62 of resilient material directed transversely across the end face of the housing 42 and the end face of the housing 40 to be held in sealing engagement therebetween at the outer periphery thereof by the fastening screws 44. The diaphragm is connected at the inner periphery thereof to one end of a tubular piston element 64 by means of a washer element 66 held in axial abutment with one face of the diaphragm 62 by a spun-over portion 68 on the end of the piston 64 whereby the diaphragm is press fit between the washer 66 and the end of the piston 64.

As best seen in FIGURES 5 and 7, the piston 64 has a hexagonally shaped shoulder portion 70 thereon slidably mounted within a longitudinally directed opening 72 formed within the tubular delay mechanism housing 40 for centering the piston 64 therein. The opposite end of piston 64 is located in axial abutment with one end of an elongated adjusting element 74 of a somewhat U-shaped cross-sectional configuration including a pair of spaced longitudinally extending racks 75 connected by a cross member 76 configured to locate the element 74 to be spaced from and slidably supported within an opening 77 substantially through the remainder of housing 40. The opposite end of the elongated rack element 74 is located in axial abutment with a washer element 78 that in turn is located in axial abutment with a coil spring 79 located within the closed end of the delay mechanism housing 40 so as to direct predetermined biasing force against the adjusting element 74 for moving the piston element 64 into the pressure chamber 58.

The closed end of the mechanism housing 40 includes an inwardly directed tubular portion 80 directed concentrically of the coil spring 79 axially therethrough to support an elongated adjustable valve opening screw 82 having one end thereof threadably engaging the inner periphery of the tubular extension 80 and an opposite unthreaded end 84 thereon directed concentrically of the grooved center of adjusting element 74 to a point located in proximity to a movable stem portion 86 of a valve element 88 supported within the tubular piston element 64. The valve element 88 is of the common bicycle tire variety having a tubular portion or inlet 90 thereon located within the pressure chamber 58 and an outlet opening controlled by the stem 86 located in communication with the opening 77 in body 40 and thence through a side aperture 93 in body 40 adjacent extension 80 therein.

A similar bicycle type valve 92 having a tubular inlet 94 is supported by the intake housing 42 within the inlet opening 54 so that a movable stem portion 96 thereon is actuatable by the tubular inlet 90 on the exhaust valve 88 to selectively control flow of fluid from the reservoir 32 through the outlet passageway 60 to a suitable point of use such as the inflatable air spring 30 illustrated in FIGURES 1 and 2.

In the illustrated arrangement, an external spring mechanism 100 located exteriorly of the delay mechanism housing 40 includes a manually actuatable lever 102 having an arm portion 104 thereon directed generally tangentially to and integrally formed with an elliptically shaped portion 106 surrounding an outwardly directed tubular bearing housing 108 on the delay mechanism housing 40. The arm portion 104 is adapted to be connected to one end of the Bowden wire assembly 38 for rotating the lever 102 about an edge portion on one side of portion 106 that is pivotally secured to the delay mechanism housing 40 by means of a screw element 109 threadably connected to the housing 40 in line with the bearing housing 108.

The opposite side of the elliptical lever 106 has a pin 110 secured thereto that extends outwardly thereof where its outer end is fastened to one end of a spring element 112 having the opposite end thereof fastened to a like pin 114 secured to a stop lever 116 having one end thereof fixedly secured to an outwardly located end of a rotatable shaft 118 and the opposite end thereof recessed at 120 to form surfaces on either side of the screw 109 arranged to engage the outer periphery thereof for limiting rotative movement of shaft 118.

The shaft 118, more particularly, has one end thereof directed through a needle bearing assembly 120 supported internally of the bearing housing 108 and has the opposite end thereof rotatably supported in a sleeve bearing 122 supported interiorly of a housing extension 124 having a somewhat conically shaped form with its apex being integrally formed with the side of the delay mechanism housing 40 opposite mechanism 100. Intermediate the ends of the shaft 118, a pinion 126 is fixedly secured thereto having teeth thereon operatively engaging the rack teeth on the adjusting element 74 whereby, upon rotation of the shaft 118 by the exteriorly located manually actuatable spring mechanism 100, the rack 74 is reciprocated within the tubular delay mechanism housing 40 to modulate the biasing action of the spring 79. The pinion shaft assembly defined by the shaft 118 and the pinion 126 further includes an annular seal element 127 seated in the bearing housing 108 in sealing engagement with the exteriorly located end of the shaft 118 and an O-ring element 128 supported within the housing extension 124 in axial abutment with the sleeve bearing 122 and in sealing engagement with the outer periphery of the inboard end of the shaft 118 to prevent fluid leakage therealong outwardly of the housing 40 at extension 124.

As is best shown in FIGURES 5 and 6, the shaft 118 further includes a driver element 130 secured at the terminus of the inboard end thereof for driving a damping disc 132 having one face in juxtaposition with a flat face 134 on the outer end of the housing extension 124 and its other face in juxtaposition with a peripheral surface portion 137 of a cover 136. A centrally located protuberant portion 138 in cover 136 forms a housing for the driver 130 and the cover 136 is secured to the housing extension 124 by suitable fastening means, for example, screws 140. The cover 136 thereby holds the mutually coextensive faces on housing extension 124, damping disc 132 and cover 136 in mutual frictional engagement and holds a sealing element 142 in place in a groove 144 in extension 124 to prevent the entrance of foreign matter interiorly thereof.

In one working embodiment, in order to obtain a particularly desired viscous damping action between disc 132 and engaging surfaces, a film of a suitable high viscosity material, for example, a silicon coating, is placed therebetween.

In the illustrated arrangement, the manually actuatable lever 102 is shown in a position wherein the fluid control action of the illustrated valve is dependent solely upon the biasing action of the internally located spring 79 since the exteriorly located spring 112 is aligned between pins 110 and 114 so as not to produce a resultant rotative force on the shaft 118 that will effect a movement of the rack 74 either away from or toward the spring 79. The spring 79 thereby acts to bias the rack 74, without being modulated by mechanism 100, so as to move the piston 64 into the pressure chamber 58 of the intake housing 42 until the tubular intake portion 90 of valve 88 engages the movable stem portion 96 of intake valve 92 sufficiently to open the valve to direct pressurized fluid from reservoir 32 into the pressure chamber 58 and thence through the outlet passageway 60 and conduits 35, 36 to the inflatable air spring elements 30 of the air lift system to cause the air lift system to provide a first predetermined increment of supplemental load carrying capacity. When the air springs 30 are so inflated the pressure in the chamber 58 will produce a resultant force on the diaphragm 62 sufficient to force the piston 64 into a balanced position against the biasing action of the spring 79 as illustrated in FIGURE 5. At this point, the valve intake 90 is spaced from the movable stem portion 96 to close the intake valve 92 and the exhaust valve stem 86 is spaced from the exhaust valve actuator stem 84.

One feature of the present invention is that there is a certain lost motion between the driver 130 and the disc 132 (see FIGURE 6) so that as the piston 64 is moved into its balanced position, it does so without damping. Preferably, the amount of lost motion between the driver 130 and the disc 132 is equal to the opening movement of the valve stem 96 and, hence, when the pressure in the inflated spring element 30 reaches a desired value as preselected by lever 102, it will cause the piston 64 to immediately respond by moving to the balanced position where both the inlet valve 94 and the exhaust valve 88 are closed to thereby trap a predetermined pressure in air springs 30 to give desired supplemental support. By virtue of the improved responsiveness, any tendency for overshooting a preselected pressure is substantially eliminated.

When it is desired to increase the load supplementing action of the air lift system, a user merely has to manipulate the Bowden wire assembly 38 to move the lever 102 in a clockwise direction about the stem 118 as viewed in FIGURE 4. This positions the pin 110 thereon out of alignment with the pin 114 to cause the spring 112 to produce a component of force acting to drive the pin 114 and stop lever 116 connected thereto in a clockwise direction whereby the shaft 118 is rotated in a like clockwise direction to reciprocate the rack 74 within the delay mechanism housing 40 in a direction to force the piston 64 into the pressurized chamber 58 against the force predetermined pressure buildup therein. Effectively, the force of the externally located spring 112 is thereby arranged in a serially additive relationship with the force of the spring 79. Rotation of shaft 118 is limited by stop lever 116 engaging pin 109 so that the piston 64 is only moved until the tubular element 90 thereon opens the inlet valve 92. The open valve 92 will direct a predetermined additional flow of pressurized fluid flow into the chamber 58 to further inflate the spring elements 30 with the increased pressure therein eventually balancing the additive spring forces of springs 79, 112 to shift the piston 64 into its balanced position.

A further feature of the invention is the damping disc 132. Thus, when the piston 64 is moved from its balanced position outwardly of the pressure chamber 58 to exhaust the air springs 30, it is necessary, in addition to overcoming the additive spring forces of the internal spring 79 and the external spring 112, to overcome the viscous damping forces produced by shearing of the damping fluid between disc 132 and the surfaces in engagement therewith. Because of this arrangement, in cases where there is a sudden pressure buildup in the air springs 30, as for example when the vehicle supported thereby passes over rough terrain to cause a shock loading of the air spring elements, the tendency for a transient pressure buildup in the pressure chamber 58 to cause the piston 64 to shift far enough to open communication between the air springs 30 and the exhaust aperture 93 through the exhaust valve 88 will be effectively negated by the damping action of disc 132. Accordingly, there is little or no pressure leakage form the air spring elements 30 because of variations in the type of terrain traversed by the vehicle.

In the illustrated embodiment, when it is desired to reduce the pressure in the system, the lever 102 is rotated counterclockwise as viewed in FIGURE 4 from the previous setting in which case a lesser amount of the spring force of spring 112 is imposed on the shaft 118 and the pressure in the air spring 30 and pressure chamber 58 corresponding to the higher setting will unbalance the piston 64 against the reduced additive spring forces of spring 79 and spring 112 to move the piston 64 so as to cause the movable stem portion 86 of exhaust valve 88 to engage valve actuator stem 84 to open the exhaust valve 88. This communicates pressure chamber 58 with the internal delay mechanism housing openings 77, 93 whereby pressurized fluid will flow from the air spring 30, outlet passage 60, pressurized pressure chamber 58, exhaust valve 88, tubular housing 40 and thence through the exhaust opening 93 to atmosphere until the pressure in the chamber 58 is lowered to the desired lower setting. The additive spring action of springs 79, 112 will then return the piston 64 to its balanced position at which point the exhaust valve 88 will be closed.

In order to fully exhaust the system, the lever 102 is moved from the position shown in FIGURE 4 counterclockwise until the spring 112 is arranged in serial opposition to the spring force 79 sufficiently to overcome the piston biasing action thereof. This causes pressure in the pressure chamber 58 to act on diaphragm 62 so as to shift the piston 64 and open the exhaust valve 88 with the piston 64 being maintained in an unbalanced exhaust position until a minimal pressure remains in the air spring 30 required to hold it against completely collapsing on itself. At this point, the piston 64 is again balanced and the system remains effectively inactive until the lever 102 is moved into one of its selected pressure positions by means of the Bowden wire assembly as discussed above.

While the embodiments of the present invention as herein disclosed constitute preferred forms, it is to be understood that other forms might be adopted.

What is claimed is as follows:

1. A fluid control device comprising, means forming a housing having an inlet passageway and an outlet passageway, piston means cooperating with said housing to form a pressure chamber therein, valve means located in said inlet passageway of said housing operable to direct a flow of pressurized fluid through said inlet passageway into said pressure chamber and thence through said outlet passageway, valve actuator means operatively associated with said piston means, means including a spring operatively associated with said piston means for shifting said piston means in a first predetermined direction to cause said valve actuator means to condition said valve means to direct pressurized fluid through said inlet passageway, said piston means and valve actuator means movable into an equilibrium position to close said first valve means upon the occurrence of a predetermined pressure in said pressure chamber, second valve means operatively associated with said piston means for exhausting said pressure chamber when said piston means is shifted in a direction opposite to said first predetermined direction, and means for damping movement of said piston means produced by transient high pressure conditions in said pressure chamber to prevent exhaust of fluid from said chamber during such periods of operation.

2. In a fluid control device for selectively directing fluid from a source of pressure to an inflatable element and from the inflatable element to atmosphere, the combination of, means forming a housing having an inlet passageway adapted to be communicated with the source of pressure and an outlet passageway adapted to be communicated with the inflatable device, piston means cooperating with said housing to form a pressure chamber in communication with said inlet and outlet passageways, first valve means in said inlet passageway for opening and closing said passageway, spring means biasing said piston means in a first predetermined direction for conditioning with said first valve means to open said inlet passageway, said piston means responding to the pressure in said pressure chamber for movement into an equilibrium position wherein the force of said spring means is balanced by the pressure in said chamber, said first valve means being closed when said piston means is in its equilibrium position, second valve means for exhausting said pressure chamber, said second valve means being operatively associated with said piston means for communicating said pressure chamber with atmosphere when said piston means is moved in a second predetermined direction past said equilibrium position, and damping means interposed between said spring means and said piston means for restraining movement of said piston means produced by transient high pressure conditions in said pressure chamber.

3. In a fluid control device for selectively directing fluid from a source of pressure to an inflatable element and from the inflatable element to atmosphere, the combination of, means forming a housing having an inlet passageway adapted to be communicated with the source of pressure and an outlet passageway adapted to be communicated with the inflatable device, piston means cooperating said said housing to form a pressure chamber in communication with said inlet and outlet passageways, first valve means in said inlet passageway for opening and closing said passageway, first spring means for biasing said piston means in a first predetermined direction for conditioning said first valve means to open said inlet passageway, second spring means for modulating the action of said first spring means to vary the spring force acting on said piston means, said piston means responding to the pressure in said pressure chamber for movement into an equilibrium position when the force of said first and second spring means is balanced by the pressure in said chamber, said first valve means being closed when said piston means is in its equilibrium position, second valve means for exhausting said pressure chamber, said second valve means being operatively associated with said piston means for communicating said pressure chamber with atmosphere when said piston means is moved in a second predetermined direction past said equilibrium position, and damping means interposed between said spring means and said piston means for restraining movement of said piston means produced by transient high pressure conditions in said pressure chamber.

4. In an air lift spring height control valve, the combination of, means forming a housing having an inlet passageway and an outlet passageway therein, piston means cooperating with said housing to form a pressure chamber communicating with said passageways, first valve means for opening and closing said inlet passageway, spring means for biasing said piston means in a first predetermined direction against the pressure in said pressure chamber for conditioning said first valve means to open said inlet passageway, second valve means for communicating said pressure chamber with atmosphere when said piston means is moved in a direction opposite to said first predetermined direction, second spring means operatively associated with said first springs means, means for selectively arranging said second spring means in series opposition or series additive relationship with said first spring means for unbalancing said piston means to move it in said first predetermined direction for opening said inlet passageway to direct pressurized fluid into said pressure chamber or direct said piston means in said second predetermined direction to exhaust pressurized fluid from said pressure chamber.

5. In an air lift spring height control valve, the combination of, means forming a housing having an inlet passageway and an outlet passageway therein, piston means cooperating with said housing to form a pressure chamber communicating with said passageways, first valve means for opening and closing said inlet passageway, spring means for biasing said piston means in a first predetermined direction against the pressure in said pressure chamber for conditioning said first valve means to open said inlet passageway, second valve means for communicating said pressure chamber with atmosphere when said piston means is moved in a direction opposite to said first predetermined direction, second spring means operatively associated with said first spring means, means for selectively arranging said second spring means in series opposition or series additive relationship with said first spring means for unbalancing said piston means to move it in said first predetermined direction for opening said inlet passageway to direct pressurized fluid into said pressure chamber or direct said piston means in said second predetermined direction to exhaust pressurized fluid from said chamber, and damping means interposed between said piston means and said first and second spring means for restraining movement of said piston means in said first and second predetermined directions upon the occurrence of transient high pressure conditions in said pressure chamber.

6. In a fluid control device, the combination of, means forming a fluid housing having an inlet passageway and an outlet passageway, a tubular member secured to said housing means, means including a movable piston element within said tubular member cooperating with said housing means to form a pressure chamber therein communicating with said inlet and outlet passageways, first valve means in said inlet passageway for controlling fluid flow therethrough, first spring means within said tubular member operatively associated with said piston element for shifting it inwardly of said pressure chamber against the pressure therein, valve actuator means operatively associated with said piston element for conditioning said first valve means to direct pressurized fluid flow into said pressure chamber upon movement of said piston element inwardly thereof, second spring means located exteriorly of said housing means, and means operatively associating said second spring means with said first spring means for modulating the resultant spring force acting on said piston means.

7. In a fluid control device, the combination of, means forming a housing having a central opening therein, means forming an inlet, an outlet and an exhaust passageway in said housing, piston means located within said central opening at one end thereof cooperating with said housing to form a pressure chamber communicating with said inlet and outlet passageways, a rack slidably mounted in said passageway having one end thereof in axial abutment with said piston means, spring means supported within the opposite end of said central opening in engagement with the opposite end of said rack for biasing said piston means inwardly of said pressure chamber, first valve means located within said inlet passageway, actuator means on said piston means operable to condition said first valve means to direct flow of pressurized fluid into said pressure chamber for passage exteriorly of said housing through said outlet passageway, said piston means responsive to a predetermined pressure buildup in said pressure chamber to move into an equilibrium position against the biasing action of said first spring means for conditioning said first valve means to close said inlet passageway, a cross shaft directed through said housing, a pinion secured intermediate the ends of said cross shaft for engagement with said rack, second spring means located exteriorly of said housing, linkage means operatively associating said second spring means with an end of said shaft located exteriorly of said housing for causing said pinion to drive said rack either against said first spring means or said piston means, means for maintaining the force of said second spring means in one of a plurality of selected positions to modulate the effect of said first spring means, said piston means responding to the accumulative effect of said first and second spring means to regulate the pressure in said pressure chamber at a predetermined value, second valve means supported interiorly of said piston means, and means within said central opening operatively associated with said second valve means when said piston means is moved a predetermined distance out of said pressure chamber for conditioning said second valve means to communicate said pressure chamber with atmosphere.

8. In a fluid control device, the combination of, means forming a housing having a central opening therein, means forming an inlet, an outlet and an exhaust passageway in said housing, piston means located within said central opening at one end thereof cooperating with said housing to form a pressure chamber communicating with said inlet and outlet passageways, a rack slidably mounted in said passageway having one end thereof in axial abutment with said piston means, spring means supported within the opposite end of said central opening in engagement with the opposite end of said rack for biasing said piston means inwardly of said pressure chamber, first valve means located within said inlet passageway, actuator means on said piston means operable to condition said first valve means to direct flow of pressurized fluid into said pressure chamber for passage exteriorly of said housing through said outlet passageway, said piston means responsive to a predetermined pressure buildup in said pressure chamber to move into an equilibrium position against the biasing action of said first spring means for conditioning said first valve means to close said inlet passageway, a cross shaft directed through said housing, a pinion secured intermediate the ends of said cross shaft for engagement with said rack, second spring means located exteriorly of said housing, linkage means operatively associating said second spring means with an end of said shaft located exteriorly of said housing for causing said pinion to drive said rack either against said first spring means or said piston means, means for maintaining the force of said second spring means in one of a plurality of selected positions to modulate the effect of said first spring means, said piston means responding to the accumulative effect of said first and second spring means to regulate the pressure in said pressure chamber at a predetermined value, second valve means supported interiorly of said piston means, means within said central opening operatively associated with said second valve means when said piston means is moved a predetermined distance out of said pressure chamber for conditioning said second valve means to communicate said pressure chamber with atmosphere, and means operatively associated with the opposite end of said cross shaft for damping rotation thereof to restrain movement of said piston means outwardly of said pressure chamber upon the occurrence of transient high pressure conditions therein.

9. A fluid control device comprising, means forming a housing having an inlet, an outlet and an exhaust passageway, movable pressure responsive means cooperating with said housing to form a pressure chamber communicating with said inlet and outlet passageways, first valve means for controlling communication between said inlet and outlet passageways, a valve actuator element secured to said pressure responsive means for movement therewith, second valve means carried by said pressure responsive means for controlling communication between said pressure chamber and atmosphere through said exhaust passageway, means including first spring means for biasing said pressure responsive means against pressure in said pressure chamber for maintaining said actuator element in an equilibrium position wherein said first and second valve means block communication between said inlet passageway, said exhaust passageway and said pressure chamber, second spring means, means for operatively associating said second spring means with said first spring means for changing the resultant force on said pressure responsive means for shifting it in a first direction along with said actuator element to open said first valve means to allow flow of pressurized fluid from said inlet passageway to said pressure chamber for passage outwardly of said housing through said outlet passageway, said pressure responsive means responding to flow of pressurized fluid into said pressure chamber to balance the resultant force on said pressure responsive means to cause it to return to its equilibrium position for preventing flow of pressurized fluid into said pressure chamber and through said outlet passageway.

10. In the fluid control device of claim 9, said pressure responsive means including a piston element located within said housing and diaphragm means connected to one end of said piston means for forming said pressure chamber, said first spring means being located within said housing to operatively engage the opposite end of said piston means and said second spring means being located exteriorly of said housing.

11. In the fluid control device of claim 9, said first spring means being located interiorly of said housing, said second spring means being located exteriorly of said housing, said means for operatively associating said first spring means to said second spring means including a rack movably supported interiorly of said housing in engagement with said first spring means, a cross shaft directed through said housing having one end thereof located exteriorly of said housing, pinion means secured to said cross shaft to operatively engage said rack, and selectively positionable means connecting said second spring means to said cross shaft for rotating said cross shaft in opposite directions to cause said second spring means to oppose or aid said first spring for varying the valve controlling action thereof.

12. In the fluid control device of claim 11, said selectively positionable means including a first lever located exteriorly of said housing having one end thereof pivotally secured thereto, means on said lever for supporting one end of said second spring means, a second lever secured to the exterior end of said cross shaft, means for securing the opposite end of said second spring means to said second lever for causing said second lever to rotate said shaft, stop means on said housing for limiting the movement of said second lever, said first lever being relatively movable with respect to said second lever for varying the effect of said second spring means on said second lever.

13. In the fluid control device of claim 11, viscous damping means secured to the opposite end of said cross shaft to restrain rotation thereof for preventing shifting movement of said rack in response to transient high pressure conditions acting upon said pressure responsive means.

14. In the fluid control device of claim 13, said viscous damping means including a flat disc secured to the opposite end of said cross shaft, an extension on said housing having an internal face for receiving said disc for rotation relative thereto, and a cover plate secured to said housing extension having the inner surface thereof in close proximity to the opposite face of said disc with said disc coated on both surfaces with suitable damping fluid to produce a predetermined desired damping of movement of said rack within said housing.

15. A manually actuatable height control valve for association with an air lift system comprising a housing having a central opening therein, means forming an inlet passageway, an outlet passageway and an exhaust passageway in said housing, movable pressure responsive means located within said housing and cooperating therewith to form a pressure chamber therein communicating with said inlet and outlet passageways, first valve means for controlling communication from said inlet passageway to said pressure chamber, a valve actuator element secured to said pressure responsive means for movement therewith, first spring means supported within said housing, second spring means located exteriorly of said housing operatively associated with said first spring means for biasing said pressure responsive means against pressure in said pressure chamber for maintaining said actuator element in an equilibrium position wherein said first valve means blocks fluid communication between said inlet passageway and said pressure chamber, a manually actuatable element having a portion thereof pivotally secured to said housing, means on said manually actuatable element for supporting one end of said second spring means, a cross shaft directed through said housing having one end thereof located exteriorly thereof, a lever secured to the exterior end of said cross shaft, means for securing said lever to the opposite end of said second spring means, means on said housing for limiting the movement of said lever, said manually actuatable element being selectively positionable relative to said lever for producing a resultant variable force on said cross shaft to cause it to rotate in opposite directions depending upon the relative positioning of said lever and said manually actuatable element, pinion means secured to said cross shaft, a rack slidably mounted within said housing driven by said pinion upon rotation of said cross shaft, said rack having the opposite ends thereof located in axial abutment with said first spring means and said pressure responsive means respectively for reducing or increasing the accumulative effect of said first and second spring means on said pressure responsive means depending upon the direction of rotation of said cross shaft as produced by the relative relationship between said manually actuatable element and said lever, said valve actuator element in response to movement of said pressure responsive means controlling said first valve means for regulating the pressure in said pressure chamber at a predetermined value corresponding to a predetermined positioning of said manually actuatable element.

References Cited by the Examiner

UNITED STATES PATENTS

| | | | |
|---|---|---|---|
| 2,735,441 | 2/1956 | Regna | 137—102 |
| 2,841,178 | 7/1958 | Schultz | 137—627.5 |
| 2,880,754 | 4/1959 | Williams | 137—627.5 X |
| 2,926,685 | 3/1960 | Schmaus | 137—430 X |
| 2,969,975 | 1/1961 | Chuba | 137—627.5 X |
| 2,977,110 | 3/1961 | Kilgore | 137—627.5 X |
| 3,026,908 | 3/1962 | Blair | 137—627.5 |
| 3,059,918 | 10/1962 | Pribonic | 137—627.5 X |
| 3,082,018 | 3/1962 | Smirl | 137—627.5 X |

WILLIAM F. O'DEA, *Primary Examiner.*

C. GORDON, *Examiner.*